US012562047B2

(12) United States Patent
Klingler et al.

(10) Patent No.: US 12,562,047 B2
(45) Date of Patent: Feb. 24, 2026

(54) DROP-IN ON COMPUTING DEVICES BASED ON EVENT DETECTIONS

(71) Applicant: Apple Inc., Cupertino, CA (US)

(72) Inventors: Daniel C. Klingler, San Jose, CA (US); John A. Aguilar, Santa Clara, CA (US); Benjamin M. Weinshel, San Francisco, CA (US); Jason J. Olson, Los Gatos, CA (US); Russell S. Greer, Los Gatos, CA (US); Hendrik Dahlkamp, Redwood City, CA (US); Miraj Hassanpur, Elk Grove, CA (US); Kevin V. Bender, Cupertino, CA (US); Sasanka T. Vemuri, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/138,652

(22) Filed: Apr. 24, 2023

(65) Prior Publication Data

US 2023/0394953 A1 Dec. 7, 2023

Related U.S. Application Data

(60) Provisional application No. 63/365,842, filed on Jun. 3, 2022.

(51) Int. Cl.
*G08B 25/00* (2006.01)

(52) U.S. Cl.
CPC .................................. *G08B 25/009* (2013.01)

(58) Field of Classification Search
CPC ...... G08B 25/009; G08B 25/016; G08B 1/08; G08B 13/1672
See application file for complete search history.

(56) References Cited

U.S. PATENT DOCUMENTS 8,548,422 B2 * 10/2013 Jenkins ................ H04M 11/045 379/38
10,380,852 B2 * 8/2019 Horling .............. G08B 13/1672
(Continued)

FOREIGN PATENT DOCUMENTS

EP 522660 A2 * 1/1993 ........... G08B 25/016

OTHER PUBLICATIONS

International Preliminary Report on Patentability issued in PCT Application No. PCT/US2023/023899, dated Dec. 12, 2024 in 8 pages.

(Continued)

*Primary Examiner* — Nay Tun
(74) *Attorney, Agent, or Firm* — BAKERHOSTETLER; Kyle B. Morse

(57) ABSTRACT

Techniques for monitoring an audio stream for triggering events are disclosed, where the triggering events may include a particular sound identified in the audio stream. In addition, the techniques include detecting the particular sound in the audio stream and/or providing an event notification to a user device via a network connection. A user device can request permission to initiate a two-way audio stream between the computing device and the user device. Further, the techniques may include receiving an indication to initiate the two-way audio stream with the user device. In addition, the techniques may include providing an alert that permission has been granted to initiate the two-way audio stream. Also, the device may include initiating the two-way audio stream with the user device.

25 Claims, 5 Drawing Sheets

(56) References Cited

U.S. PATENT DOCUMENTS

| | | | | |
|---|---|---|---|---|
| 10,803,729 | B1 * | 10/2020 | Di Mauro | G08B 21/22 |
| 11,064,339 | B2 * | 7/2021 | Hamre | G10L 15/08 |
| 11,138,858 | B1 * | 10/2021 | Segal | G08B 25/014 |
| 2006/0176167 | A1 * | 8/2006 | Dohrmann | G08B 25/007 340/506 |
| 2009/0310762 | A1 * | 12/2009 | Velius | G10L 15/26 704/270.1 |
| 2009/0325559 | A1 * | 12/2009 | Blum | H04M 11/04 455/415 |
| 2011/0098016 | A1 * | 4/2011 | Hatton | H04W 76/50 704/9 |
| 2012/0001856 | A1 * | 1/2012 | Davidson | G06F 3/04883 345/173 |
| 2013/0143519 | A1 * | 6/2013 | Doezema | A61B 5/681 455/404.2 |
| 2013/0271277 | A1 * | 10/2013 | McCauley | G08B 25/016 340/517 |
| 2017/0357411 | A1 * | 12/2017 | Williams | G06F 3/016 |
| 2018/0330589 | A1 * | 11/2018 | Horling | G08B 15/002 |
| 2020/0329358 | A1 * | 10/2020 | Hamre | G10L 15/08 |
| 2021/0160675 | A1 * | 5/2021 | Perry | H04W 4/029 |
| 2022/0073110 | A1 * | 3/2022 | Kleve | H04W 4/90 |
| 2022/0215741 | A1 * | 7/2022 | Martin | G08B 25/14 |
| 2023/0394953 | A1 * | 12/2023 | Klingler | G08B 25/009 |

OTHER PUBLICATIONS

International Search Report and Written Opinion issued in PCT Application No. PCT/US2023/023899, dated Sep. 15, 2023 in 11 pages.

* cited by examiner

DROP-IN ON COMPUTING DEVICES BASED ON EVENT DETECTIONS

CROSS-REFERENCE TO RELATED APPLICATIONS

This application is a non-provisional of and claims the benefit and priority under 35 U.S.C. 119(e) of U.S. Provisional Application No. 63/365,842, filed on Jun. 3, 2022, entitled "Drop-In On Computing Devices Based On Event Detections," the contents of which is incorporated by reference herein in their entirety for all purposes.

BACKGROUND

Two-way audio communication between electronic devices can allow for improved crisis detection, notification, and communication. An electronic device can be used to monitor other devices to detect trigger events. The electronic device can further provide notifications or communication to other electronic devices. Accordingly, improvements to two-way audio communication techniques are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a—computer-implemented method may include monitoring a one-way audio stream for one or more trigger events. The one or more trigger events may include a particular sound identified in the one-way audio stream. In addition, the method can include detecting the particular sound in the one-way audio stream. The method may also include providing an event notification to an user device via a network connection. The event notification can request permission to initiate a two-way audio stream between the computing device and the user device. The method may further include receiving an indication to initiate the two-way audio stream with the user device. The indication can be based at least in part on the event notification. The method may in addition include providing a first alert via a speaker of the computing device. The alert can indicate that permission has been granted to initiate the two-way audio stream. The method may also include initiating the two-way audio stream with the user device. Other embodiments of this aspect include corresponding computer systems, apparatus, and computer programs recorded on one or more computer storage devices, each configured to perform the actions of the methods.

Implementations may include one or more of the following features. A technique where providing an event notification includes determining a distance between the computing device and a source of the detected particular sound. The technique can include transmitting the determined distance to a plurality of monitoring devices associated with the computing device. In addition, the technique can include receiving one or more determined distances from a subset of monitoring devices that detected the particular sound. The technique can include comparing the determined distance and the one or more determined distances to determine if the computing device is closer to the source than the subset of monitoring devices. The technique can include providing an event notification to the user device upon determining that the computing device is closer than the subset of monitoring devices.

Implementations may include providing a notification to a second user device.

Implementations may include a technique where the two-way audio stream is a multidirectional audio stream. The multidirectional audio stream can be between the computing device, the user device, and the second user device.

Implementations may include a technique where providing an event notification further includes initiating an event timer. The two-way audio stream can be initiated during the event timer.

Implementations may include techniques where the event notification identifies the particular sound identified in the audio stream.

Implementations may include techniques where initiating the two-way audio stream includes providing a second alert at regular intervals for a duration of the two-way audio stream. The second alert can announce that a two-way audio stream has been initiated. Implementations of the described techniques may include hardware, a technique or process, or a computer tangible medium.

In one general aspect, techniques implemented by a non-transitory computer-readable medium may include monitoring an one-way audio stream for one or more trigger events. The one or more trigger events may include a particular sound identified in the one-way audio stream. The techniques may include detecting the particular sound in the audio stream. The techniques may also include providing an event notification to an user device via a network connection. The event notification may request permission to initiate a two-way audio stream between the computing device and the user device. The techniques may further include receiving an indication to initiate the two-way audio stream with the user device based at least in part on the event notification. The techniques may in addition include providing a first alert, via a speaker of the computing device, that permission has been granted to initiate the two-way audio stream. The techniques may also include initiating the two-way audio stream with the user device. Other embodiments of this aspect include corresponding computer systems, apparatus, and computer programs recorded on one or more computer storage devices, each configured to perform the actions of the methods.

In one general aspect, computing device may include a storage device, a speaker and one or more processors configured to execute program instructions stored in the storage device to at least monitor an one-way audio stream for one or more trigger events The one or more trigger events may include a particular sound identified in the one-way audio stream. The instructions may cause the one or more processors to detect the particular sound in the audio stream. The instructions may cause the one or more processors to provide an event notification to an user device via a network connection. The event notification requesting permission to initiate a two-way audio stream between the computing device and the user device. The instructions may cause the one or more processors to receive an indication to initiate the two-way audio stream with the user device based at least in part on the event notification. The instructions may cause the one or more processors to provide a first alert, via the speaker, that permission has been granted to initiate the two-way audio stream. The instructions may cause the one or more processors to initiate the two-way audio stream with the user device. Other embodiments of this aspect include corresponding computer systems, apparatus, and computer programs recorded on one or more computer storage devices, each configured to perform the actions of the methods.

DETAILED DESCRIPTION

Figure 1:
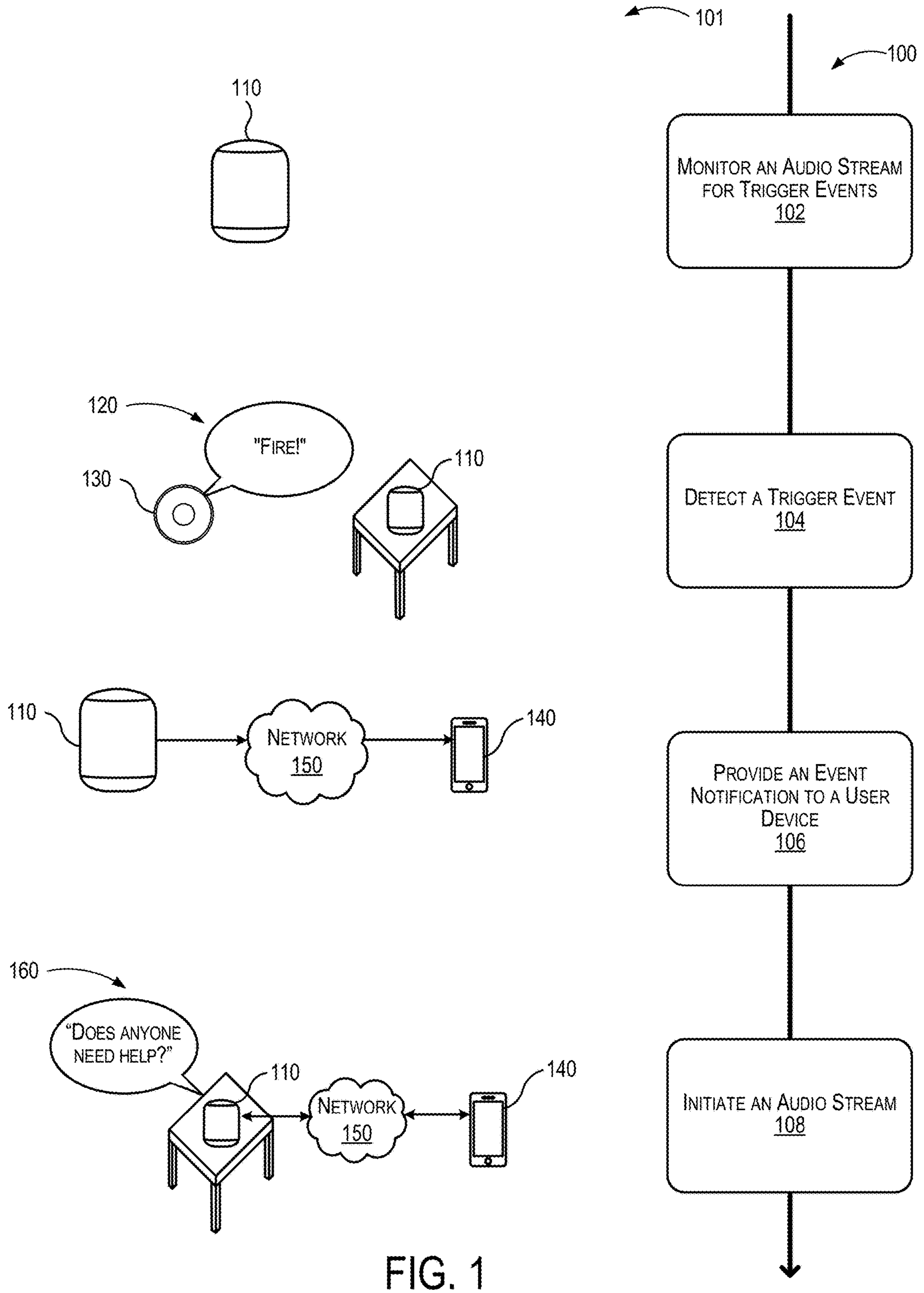
FIG. 1 shows a diagram and method for initiating an audio stream in response to a detected event according to an embodiment.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for using a computing device to initiate a call in response to a detected event according to an embodiment. Example computing devices for performing the techniques described herein include a smart speaker, a smart media player, a tablet computer, or a user device such as a smart phone. In some examples, smart speakers or smart media players may be computing devices with at least a microphone and a speaker. Unlike many computing devices, a smart speaker or smart media player may not necessarily have a display device. Input, therefore, may be provided to the smart speaker or media player as spoken natural language commands, and output may be delivered from the speakers as simulated speech (or a recording of actual speech). To protect privacy, input to a smart speaker can be provided as stylized interactions comprising one or more wake words/phrases followed by a command or query. For instance, the wake words "Hi Device." can be followed by the query "Will it rain today?" While many of the examples below are provided within the context of the computing device being a smart speaker or media player without a display, other types of computing devices may also perform the described techniques. For example, the computing device may be a smart media streaming device (e.g., connected to a television), a tablet device, a smart phone, or the like.

In a monitoring phase, the computing device can listen for the wake words while ignoring other audio input. After the computing device detects the wake words, the device can enter a command phase where the speaker can monitor for spoken user commands. For example, the computing device can query a search engine in response to a user command, control smart devices associated with the computing device using commands (e.g., "Hi Device, please turn off the kitchen lights."), or communicate with a user device. The computing device may generate an auditory or visual response, upon detecting the wake words, to notify users that the command phase has begun and their speech will be monitored. This two phase monitor and command configuration can protect user privacy because a user consciously initiates an interaction with the smart speaker using the wake words.

In addition to receiving spoken commands, the computing device can be configured to perform event monitoring. Instead of only listening for wake words, the computing device can also monitor for particular sounds associated with an event. For instance, a computing device can listen for various alarms or alerts. Alarms or alerts can correspond to a smoke detector alarm that is, a carbon monoxide alarm, a security alarm (e.g., detecting motion or a broken window). Upon detecting an event, the computing device can send a notification to one or more user devices associated with the computing device notifying one or more users that the event has been detected.

A trigger event can be a particular sound associated with an event. A trigger event can be an alarm or alert generated by an electronic device, and, for instance an alarm from a smoke detector, a security alarm, a carbon monoxide alarm, a flood detection alarm, etc. A trigger event is not necessarily a sound generated by an electronic device and other sounds can be trigger events. For instance, trigger events can include sounds caused by physical damage to a structure such as broken material (e.g., shattered glass), the sound of burning material (e.g., burning wood), and water sounds such as those caused by a broken pipe or fire suppression sprinklers. Sounds caused by humans or animals can be trigger events, and trigger events can include the sound of a person falling, an animal or human in distress, animal noises (e.g., a barking dog), etc.

In response to a trigger event, a user can initiate a call between a user device and the computing device. The computing device can broadcast a notification that a call has been initiated before the user device connects with the computing device. In addition, the computing device can provide regular audio or visual notifications for the duration of the call. For instance, a light on top of the computing device can be illuminated and a tone can sound at 30 second intervals. Regular notifications during a call can mitigate the risk that someone near the computing device participates in the call without their consent.

In an illustrative example, a homeowner's smart speaker may be in her kitchen. The smart speaker is configured to listen for several particular sounds associated with trigger events including a smoke detector alarm associated with a fire. While at work, the homeowner receives a phone notification that the smart speaker has detected a kitchen smoke alarm. The homeowner cannot reach her partner, who works at home, on his phone and the homeowner decides to contact her partner through the smart speaker. The homeowner initiates a call through the smart speaker and learns from her partner that the alarm was caused by burned toast and emergency services are not needed.

I. Event Monitoring

A microphone on one or more computing devices, such as a smart speaker, can be used to monitor for particular sounds associated with an event. The one or more computing devices can provide a notification to user devices in response to the detected trigger event. A user can initiate an audio stream (e.g., call) between the user device and computing device in response to the notification. If multiple computing devices are present the call may be initiated with the device that is closest to the event. After the call is initiated, additional users may join the audio stream in response to the notification.

A. Two-Way Audio Stream

FIG. 1 shows a diagram 101 and method 100 for initiating an audio stream in response to a detected event according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 100 in greater detail, at block 102, an audio stream is monitored for trigger events. A microphone on an computing device 110 can monitor an audio steam for one or more particular sounds associated with an event (e.g., trigger events). Computing device 110 can be located in a monitored area and the electronic device can be any computing device that can receive audio input. The monitored area can be an enclosed area such as a room, a house, a store, etc. An event can be any event that can be detected through sound. For instance, the events can include fire, water damage, smoke damage, burglary, someone at the door, pet damage, a person in distress, etc.

At block 104, a trigger event can be detected. Computing device 110 can detect a sound in the monitored audio stream, and the detected sound can be a trigger event. The trigger event can include burning material, an alarm, breaking material (e.g., glass, wood, fabric, etc.), running water, knocking, a doorbell, a crash, animal noises, furniture moving, etc. For instance, computing device 110 can hear an alarm that is a trigger event 120 generated by a smoke detector.

At block 106, computing device 110 can provide a notification to a user device 140. The notification can be provided to the user device 140 via a network 150. The notification can be delivered as a text message, a push notification, an email, a pre-recorded phone call, a pre-recorded voice over internet protocol (VOIP) call, etc. The user device can be a computing device such as a smartphone, a smartwatch, a tablet, a personal computer, etc. The user device 140 may be enabled to communicate using one or more network protocols (e.g., a Bluetooth connection, a Thread connection, a Zigbee connection, a WiFi connection, etc.) and network paths over the network(s) 408 (e.g., including a LAN or WAN).

A notification may include an audio segment containing the trigger event. A recording of the trigger event can allow a user to better understand and respond to the event. The notification can include a video segment that was recorded during the trigger event if the computing device, or an electronic device communicably connected to or associated with the electronic device, includes a camera. The notification can include one or more pictures captured by the camera. The notification can present options that a user can select using user device 140. For instance, the notification can prompt a user to call emergency services (e.g., 911). The notification can prompt the user to call, text, email, or otherwise notify emergency contacts associated with user device 140 or computing device 110.

In some circumstances, computing device 110 may automatically call, text, email, or otherwise notify emergency services or emergency contacts. Certain trigger events may cause electronic device 110, or user device 140, to automatically contact emergency services or emergency contacts. For example, emergency services may be automatically contacted if a fire or break in is detected, but not if an animal chewing furniture is detected. Emergency services or emergency contacts may be automatically contacted depending on the severity of the trigger event. For instance, emergency services or emergency contacted may not be automatically contacted a smoke alarm trigger event is detected, but emergency services and emergency contacts may be automatically contacted if trigger events for a smoke alarm, burning material, and fire suppression sprinklers are detected. In some instances, information from a camera that is communicably connected to, or associated with, computing device 110 can determine whether emergency services or emergency contacts are automatically contacted. For instance, emergency services or emergency contacts may be automatically contacted if the camera detects a sufficient amount of smoke, visible flames, or an intruder in the monitored area.

At block 108, an audio stream can be initiated. The audio stream can be initiated by user device 140. The audio stream can be transmitted between the user device 140 and the computing device 110 via network 150. Speech recorded at user device 140 can be broadcast as audio 160 by a speaker on or controlled by computing device 110. In some circumstances, the computing device 110 and user device 140 can communicate using typed messages. Typed messages (e.g., emails short message service (SMS) messages, etc.) can be sent between the user device 140 and computing device 110. Typed messages received by computing device 110 can be converted to audio 160 using natural language processing techniques. Computing device 110 can transcribe spoken messages and transmit the text to the user device 140.

The audio 160 broadcast by computing device 110 can include an alert notifying anyone in the monitored area that an audio stream has been initiated. The alert can comprise an alert at the beginning of the audio stream, alerts at regular intervals during the audio stream, or an alert after the audio stream has concluded. Computing device 110 can also provide one or more visual alerts before, during, or after the call. For example, a blinking light on computing device 110 can serve as an alert that a call (e.g., audio stream) is ongoing.

A user may listen or watch the trigger event after joining the audio stream. For instance, a graphical user interface running on user device 140 may prompt the user to listen or watch the trigger event after joining the audio stream. The recorded audio or video containing the trigger event may be shown to the user after an audio stream is requested via user device 140 but before the audio stream is initiated.

B. Multi-Directional Audio Stream

Figure 2:
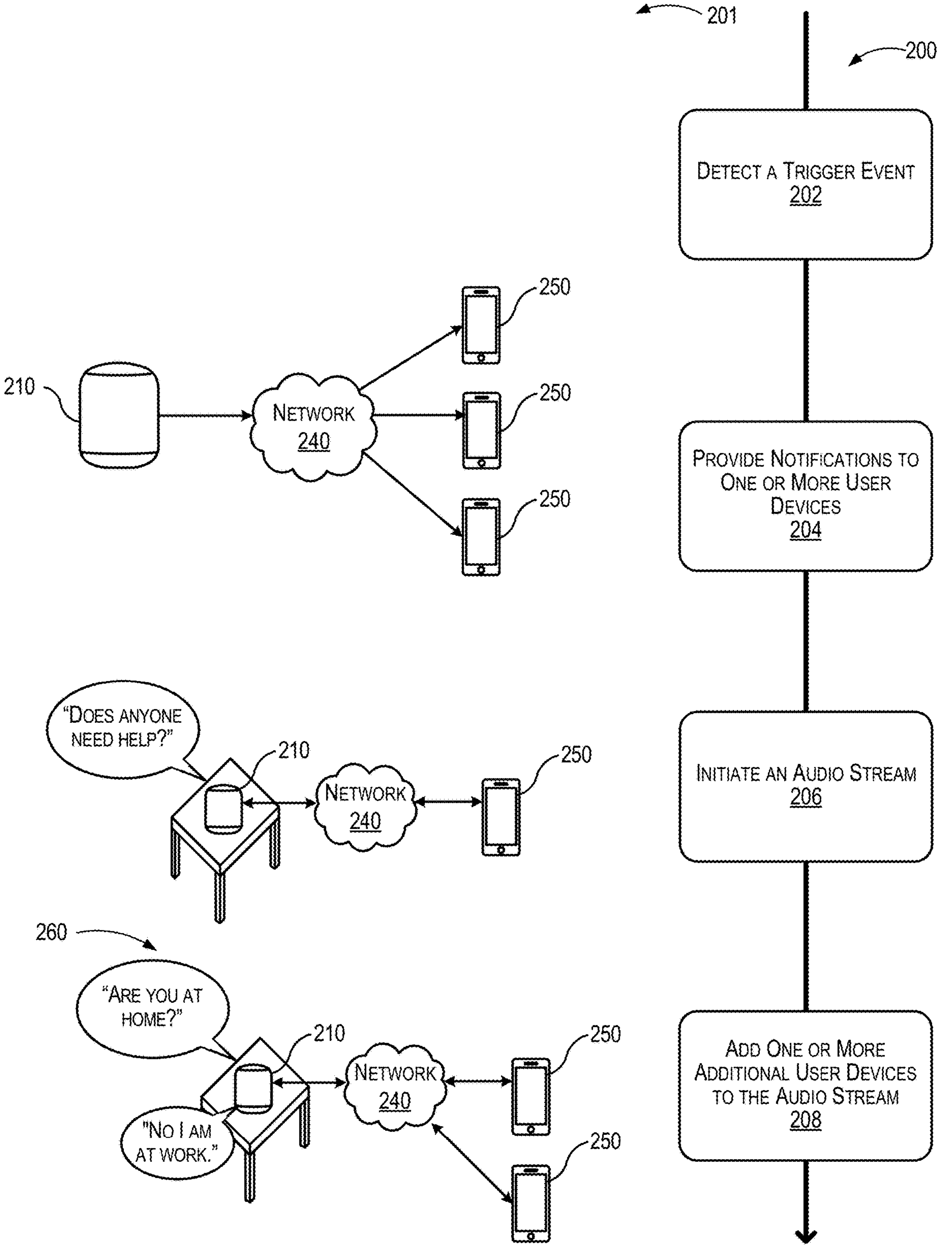
FIG. 2 shows a diagram and method for initiating a multi-directional audio stream according to an embodiment.

FIG. 2 shows a diagram 201 and method 200 for initiating a multi-directional audio stream according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 200 in greater detail, at block 202, the computing device can detect a trigger event. The trigger event can be detected in the monitored area by computing device 210 according to the method disclosed at block 104. At block 204, the computing device 210 can provide a notification to one or more user devices 250 via the network 240. Some or all of user device 250 can be notified and, in some circumstances, location data or other information can be used to determine which user devices 250 are notified. For example, if a user device may not receive a notification if it is connected to the same WiFi network as computing device 210.

A notification may include an audio segment containing the trigger event. A recording of the trigger event can allow a user to better understand and respond to the event. The notification can include a video segment that was recorded during the trigger event if the computing device, or an electronic device communicably connected to or associated with the electronic device, includes a camera. The notification can include one or more pictures captured by the camera. The notification can present options that users can select using user devices 250. For instance, the notification can prompt a user to call emergency services (e.g., 911). The notification can prompt the user to call, text, email, or otherwise notify emergency contacts associated with user device 250 or computing device 210.

In some circumstances, computing device 210 may automatically call, text, email, or otherwise notify emergency services or emergency contacts. Certain trigger events may cause electronic device 210, or user devices 250, to automatically contact emergency services or emergency contacts. For example, emergency services may be automatically contacted if a fire or break in is detected, but not if an animal chewing furniture is detected. Emergency services or emergency contacts may be automatically contacted depending on the severity of the trigger event. For instance, emergency services or emergency contacted may not be automatically contacted a smoke alarm trigger event is detected, but emergency services and emergency contacts may be automatically contacted if trigger events for a smoke alarm, burning material, and fire suppression sprinklers are detected. In some instances, information from a camera that is communicably connected to, or associated with, computing device 210 can determine whether emergency services or emergency contacts are automatically contacted. For instance, emergency services or emergency contacts may be automatically contacted if the camera detects a sufficient amount of smoke, visible flames, or an intruder in the monitored area.

At block 206, an audio stream can be initiated with a first user device. User device 250 may initiate the stream with computing device 210 via network 240. The audio stream can be initiated in response to the notification from block 204. The notification may include a permission file granting permission for a mobile device to initiate an audio stream with the computing device. In some circumstances, notifications may be provided to multiple user devices but the permission file may vary between user devices. For instance, one version of the permission file may allow a mobile device to initiate a stream and a different version of the permission file may allow a mobile device to join an existing call that has already been initiated.

At block 208, one or more additional user device can be added to the audio stream. Audio 260 received as an audio stream from two or more of the user devices 250 can be broadcast from a speaker on or controlled by the computing device 210. A user device, of user devices 250, can receive and broadcast an audio stream from computing device 210 and one or more of the user devices 250. An audio stream can comprise audio recorded by at least one of computing device 210 or user devices 250. Computing device 210, and any user devices 250 participating in the audio stream, may receive a notification when an additional device attempts to join the audio stream. In some circumstances, the notification may include a request to grant permission for the additional device to join the audio stream. A device participating in an audio stream (e.g., computing device 210, user devices 250, etc.) may be able to use a notification to invite one or more additional devices to the audio stream.

A user may listen or watch the trigger event after joining the audio stream. For instance, a graphical user interface running on one or more user devices 250 may prompt users to listen or watch the trigger event after joining the audio stream. The recorded audio or video containing the trigger event may be shown to the users after an audio stream is requested via user devices 250 but before the audio stream is initiated.

C. Selecting a Speaker

Figure 3:
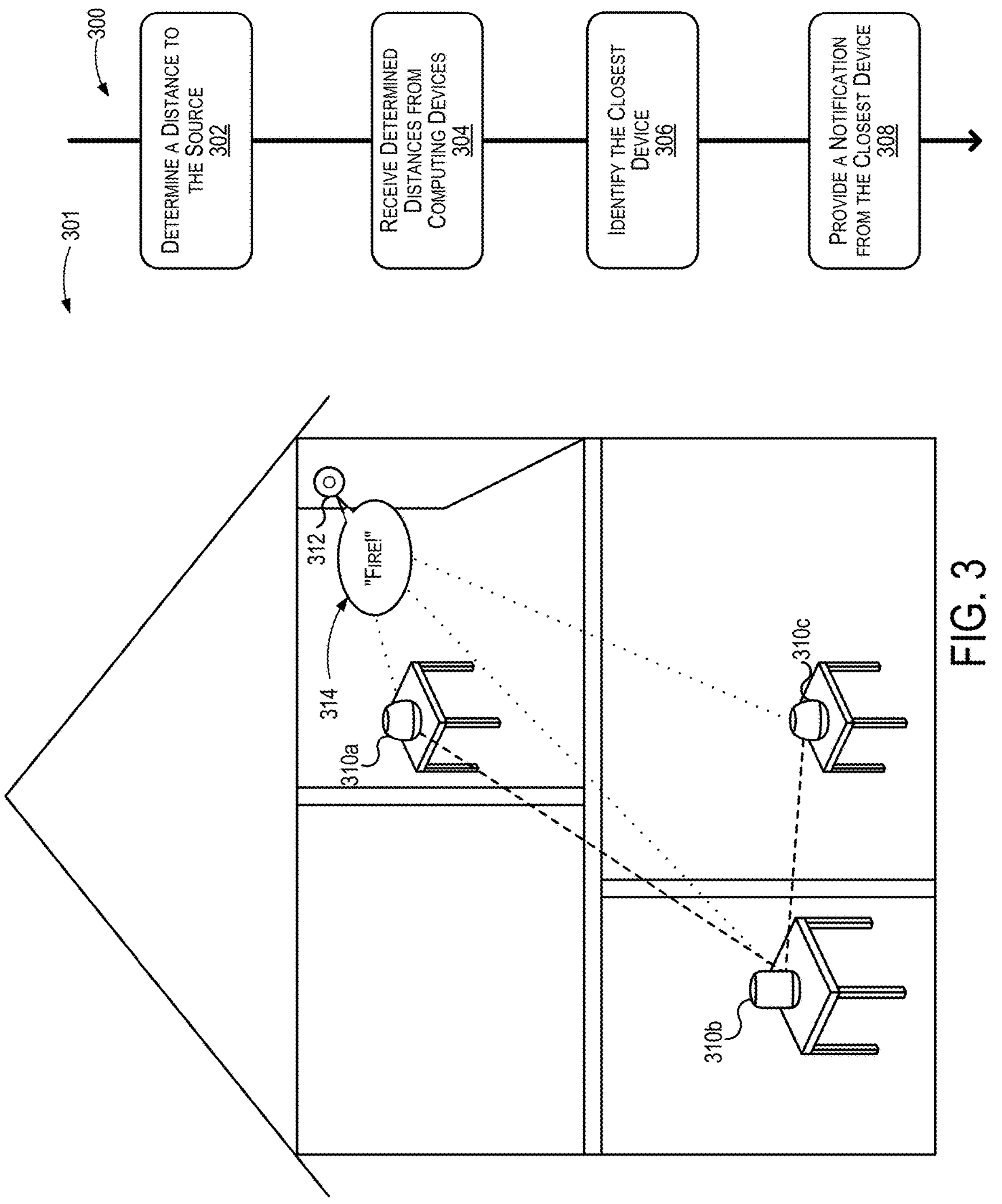
FIG. 3 shows a method for selecting a computing device in a monitored environment according to an embodiment.

In some circumstances, multiple computing devices may be used in a monitored environment. It may be desirable to determine the closest computing device to the source of a sound so that the audio steam can be initiated with a device close to the trigger event. FIG. 3 shows a method 300 for selecting a computing device in a monitored environment 301 according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 300 in greater detail, at step 302, a distance to the source can be determined. The distance to can be the distance between a computing device (e.g., computing devices 310*a-c*) and the source 312 of the trigger event 314 (e.g., audio, particular sound, etc.). Computing devices 310*a-c* can use information about trigger event 314 to determine a relative distance between a computing device and source 312. For instance, computing devices 310*a-c* can measure the length of the reverberation of trigger event 314 at each computing device to determine a distance to source 312.

As an example, computing device 310*a* may have a measureable reverberation length because computing device 310*a* is in a room with the source 312. Computing devices 310*b-c* may have a negligible reverberation length because the two devices are not in the room with source 312. If two or more computing devices are in the room with source 312, the computing device with the shortest reverberation length may be the closest to the source. In some circumstances, a computing device may be determined to be located in a room with the source if the reverberation length is above a threshold. For example the threshold length could be 1 millisecond (ms), 10 ms, 50 ms, 100 ms, 200 ms, 500 ms, 1 second, 2 seconds, etc. Reverberation length can be determined by measuring the time it takes for a sound level to decrease by an amount of decibels (dB). For example, the reverberation length can be the time it takes for a sound to decrease by 60 dB.

Other methods for determining distances between computing devices 310*a-c* and source 312 are contemplated. The other methods can be used alone, in combination with each other, or with the calculated reverberation, to determine the distances. For example, the time of arrival for trigger event 314 can be used to determine distances between source 312 and computing devices 310*a-c*. The clocks for computing devices 310*a-c* can be synchronized and a time of arrival for trigger event 314 at each device can be determined. The device that received trigger event 314 first can be the closest device to source 312.

At block 304, the determined distances can be received from computing devices. For instance computing device 310*b* can receive demined distances from computing devices 310*a* and 310*b*. Computing device 310*b* may receive information about trigger event 314 from the other computing devices and computing device 310*b* can use the information to calculate distance of one or more devices. In some circumstances, computing devices 310*a-c* can provide information about trigger event 314 to an additional device (e.g., server device 410, user device 140, user devices 250, user devices 404, etc.) that can calculate the distance between computing devices 310*a-c* and source 312. Computing devices 310*a-c* can provide the distances or information about trigger event 314 via a network (e.g., network(s) 408, etc.).

At block 306, the closest device can be identified. The closet device can be the computing device, of computing devices 310*a-c*, with the shortest determined distance to source 312. The distances can be compared to determine the closest distance to source 312. The distances can be compared by one or more of the computing devices 310*a-c*, a server computer (e.g., server device 410, etc.), a user device (e.g., user devices 404, etc.), etc. At block 308, a notification can be provided from the closest device. The notification can be provided to a user device (e.g., user device 140, user devices 250, user devices 404, etc.) via a network (e.g., network 150, network 240, network(s) 408, etc.). The notification can be used by the user device to initiate an audio stream as described herein.

D. Exemplary Computing Device

Figure 4:
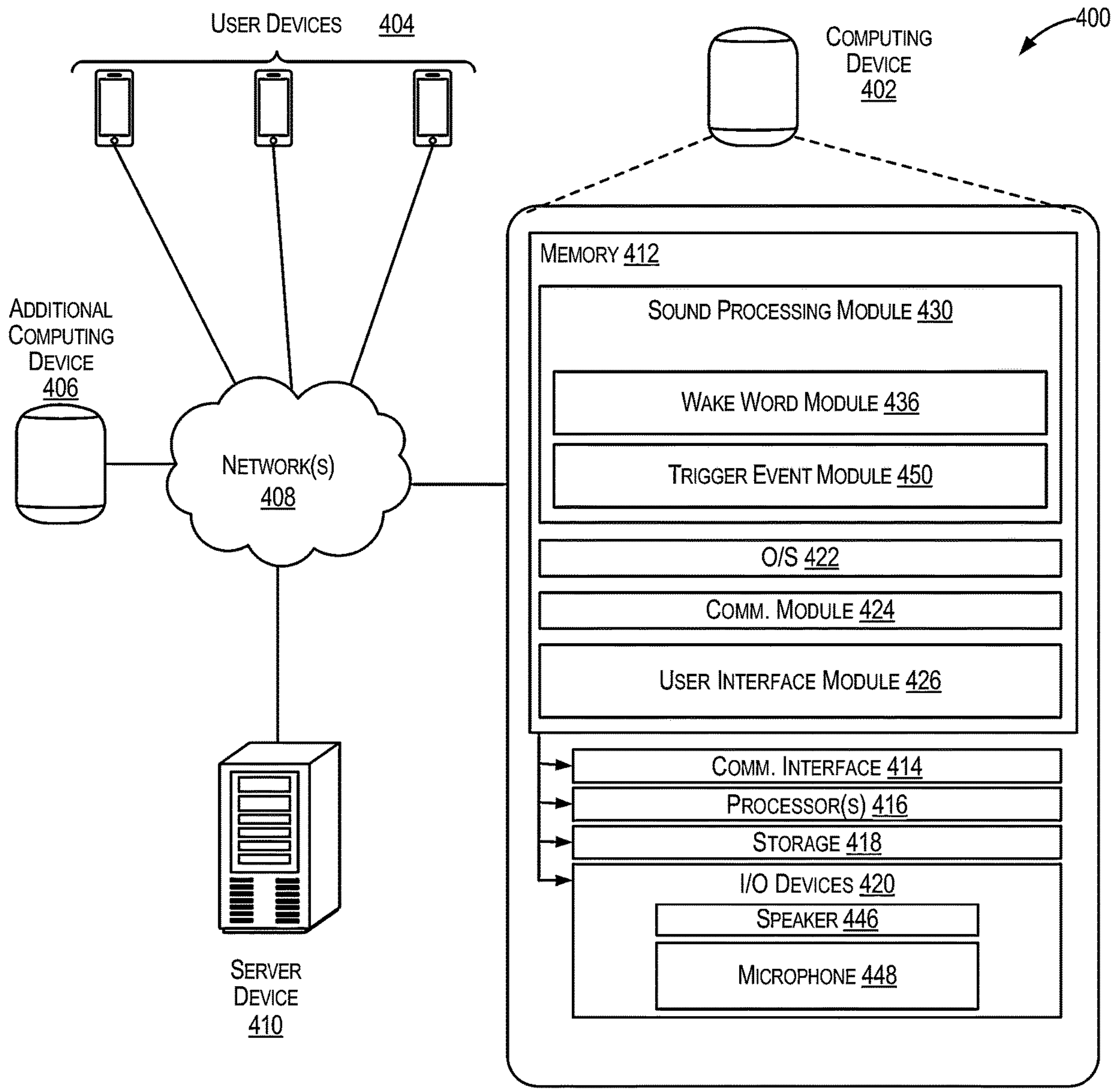
FIG. 4 is a simplified block diagram illustrating an example architecture of a system used to detect and act upon a trigger event, according to some embodiments

FIG. 4 is a simplified block diagram 400 illustrating an example architecture of a system used to detect and act upon a trigger event, according to some embodiments. The diagram includes a representative computing device 402, one or more user devices 404, one or more additional computing devices 406, one or more network(s) 408, and a server device 410. Each of these elements depicted in FIG. 4 may be similar to one or more elements depicted in other figures described herein. In some embodiments, at least some elements of diagram 400 may operate within the context of a monitored environment (e.g. the monitored environment 301 of FIG. 3).

The user devices 704 may be any suitable computing device (e.g., smartphone, smartwatch, laptop computer, tablet computer, etc.). In some embodiments, a user device may perform any one or more of the operations of user devices described herein. Depending on the type of user device and/or location of the accessory device (e.g., within the monitored environment or outside the monitored environment), the user device may be enabled to communicate using one or more network protocols (e.g., a Bluetooth connection, a Thread connection, a Zigbee connection, a WiFi connection, etc.) and network paths over the network(s) 408 (e.g., including a LAN or WAN), described further herein.

In some embodiments, the server device 410 may be a computer system that comprises at least one memory, one or more processing units (or processor(s)), a storage unit, a communication device, and an I/O device. In some embodiments, the server device 410 may perform any one or more of the operations of server devices described herein. In some embodiments, these elements may be implemented similarly (or differently) than as described in reference to similar elements of computing device 402.

In some embodiments, the representative computing device 602 may correspond to any one or more of the computing devices described herein. For example, the computing device 402 may correspond to one or more of the computing devices of the monitored environment 301 of FIG. 3. The representative computing device may be any suitable computing device (e.g., a smart speaker, a mobile phone, tablet, a smart hub speaker device, a smart media player communicatively connected to a TV, etc.). The one or more additional computing devices 406 may correspond to the computing device 402 disclosed herein.

In some embodiments the one or more network(s) 408 may include an Internet WAN and a LAN. As described herein, the home environment may be associated with the LAN, whereby devices present within the monitored environment may communicate with each other over the LAN. As described herein, the WAN may be external from the monitored environment. For example, a router associated with the LAN (and thus, the monitored environment) may enable traffic from the LAN to be transmitted to the WAN, and vice versa. In some embodiments, the server device 610 may be external to the monitored environment, and thus, communicate with other devices over the WAN.

As described herein, computing device 402 may be representative of one or more computing devices connected to one or more of the network(s) 408. The computing device 402 has at least one memory 412, a communications interface 414, one or more processing units (or processor(s) 416, a storage unit 418, and one or more input/output (I/O) device(s) 420.

Turning to each element of computing device 402 in further detail, the processor(s) 416 may be implemented as appropriate in hardware, computer-executable instructions, firmware or combinations thereof. Computer-executable instruction or firmware implementations of the processor(s) 416 may include computer-executable or machine executable instructions written in any suitable programming language to perform the various functions described.

The memory 412 may store program instructions that are loadable and executable on the processor(s) 416, as well as data generated during the execution of these programs.

Depending on the configuration and type of computing device 402, the memory 412 may be volatile (such as random access memory ("RAM")) or non-volatile (such as read-only memory ("ROM"), flash memory, etc.). In some implementations, the memory 412 may include multiple different types of memory, such as static random access memory ("SRAM"), dynamic random access memory ("DRAM") or ROM. The computing device 402 may also include additional storage 418, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 418 may be utilized to store data contents received from one or more other devices (e.g., server device 410, other computing devices, or user devices 404). For example, the storage 418 may store accessory management settings, accessory settings, and user data associated with users affiliated with the monitored environment.

The computing device 402 may also contain the communications interface 414 that allows the computing device 402 to communicate with a stored database, another computing device or server, user terminals, or other devices on the network(s) 408. The computing device 402 may also include I/O device(s) 420, such as for enabling connection with a keyboard, a mouse, a pen, a voice input device, a touch input device, a display, speakers, a printer, etc. In some embodiments, the I/O devices(s) 420 may be used to output an audio response or other indication as part of executing the response to a user request. The I/O device(s) can include one or more speakers 446 or one or more microphones 448.

The memory 412 may include an operating system 422 and one or more application programs or services for implementing the features disclosed herein, including a communications module 424, a user interface module 26, a sound processing module 430, accessory interaction instance(s) 432, and a management module 434. The sound processing module further comprises a wake word module 436 and the accessory interaction instance(s) 432 further comprise a digital assistant 638. The sound processing module further comprises a trigger event module 450 that can be configured to detect one or more sounds associated with trigger events.

The communications module 424 may comprise code that causes the processor(s) 416 to generate instructions and messages, transmit data, or otherwise communicate with other entities. As described herein, the communications module 424 may transmit messages via one or more network paths of network(s) 408 (e.g., via a LAN associated with the monitored environment or an Internet WAN). The user interface module 426 may comprise code that causes the processor(s) 416 to present information corresponding to the computing devices and user devices present within or associated with a monitored environment.

The sound processing module 430 can comprise code that causes the processor(s) 416 to receive and process an audio input corresponding to speech or other sound amenable to analysis by techniques described herein Wake word module 436 can comprise code that causes processor(s) 416 to receive and process a portion of an audio input corresponding to a trigger or wake word. For example, wake word module 436 can analyze a portion of an audio input to determine the presence of a wake word. The speech processing module can also, in some embodiments, determine a language corresponding to the audio input and use that language to inform the analysis of the wake word portion. Trigger event module 450 can comprise code that causes processor(s) 416 to receive and process a portion of an audio input (e.g., an audio segment) corresponding to a trigger event. For example, trigger event module 450 can analyze an audio segment to determine the presence of a particular sound associated with a trigger event. The trigger event module can also, in some embodiments, determine a trigger event corresponding to the audio input.

II. Method Flow

Figure 5:
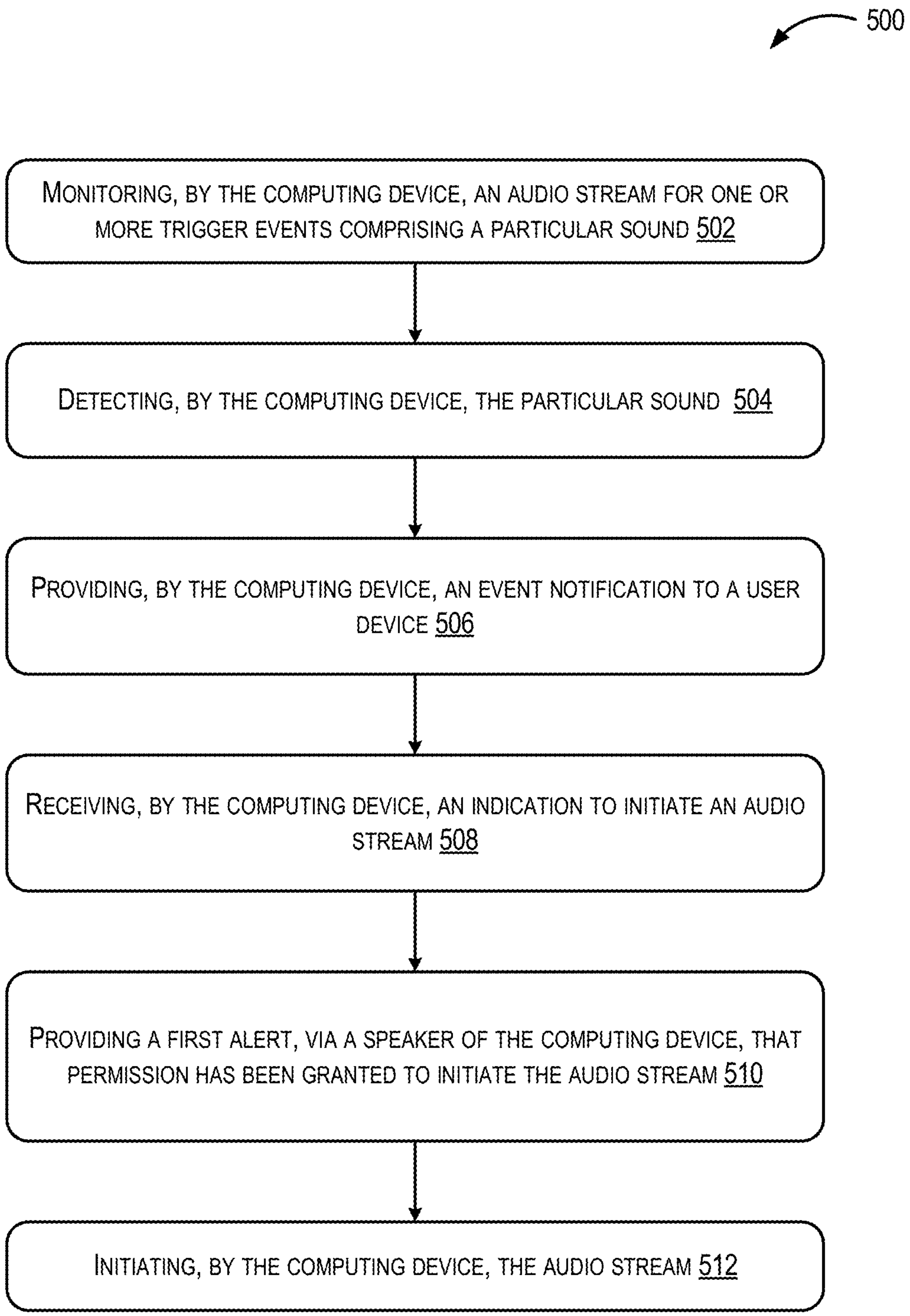
FIG. 5 shows a method 500 for initiating a call with a smart speaker according to an embodiment.

FIG. 5 shows a method 500 for event monitoring with a smart speaker according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 502, a computing device can monitor an audio stream for one or more trigger events comprising a particular sound. The audio stream can be a one-way audio stream. The computing device can be a smart speaker, a smart media player, a tablet computer, or a user device such as a smart phone, etc. The computing device (e.g., computing device 402, sound processing module 430, trigger event module 450, etc.) can monitor the audio stream using a microphone (e.g., microphone 448, etc.). The one or more trigger events (e.g., particular sounds, trigger event 120, trigger event 314, etc.) can include sound associated with any event that can be detected through audio. For instance, the trigger event can include a fire, water damage, a forced entry to the monitored environment, animal noises (e.g., a barking dog), a fallen person, a carbon monoxide alarm, a broken window, a gunshot, etc.

At block 504, the computing device can detect the particular sound. The sound can be detected by the computing device's (e.g., computing device 110, computing device 210, computing devices 310*a-c*, computing device 402, additional computing device 406, etc.) trigger event module (e.g., sound processing module 430, trigger event module 440). In some circumstances, more than one computing device can detect the particular sound or trigger event (e.g., computing device 110, computing device 210, computing devices 310*a-c*, computing device 402, additional computing device 406, etc). Each device detecting the sound can use its sound processing module to determine a distance between the individual computing device and the trigger event. The computing device can receive additional distances determined by one or more additional computing devices or a server device (e.g., server device 410). The sound processing module can compare the determined distances to identify a computing device that is closest to the particular sound (e.g., trigger event 120, trigger event 314, etc). The computing device that is determined to be closest to the particular sound can provide a notification to the user devices (e.g., user devices 404). The distance can be determined using information about the particular sound including the measured reverberation or time of arrival for the sound as described herein.

At block 506, the computing device can provide an event notification to a user device. The notification can be provided to a user device (e.g., user device 140, user devices 250, user devices 404, etc.) via a network (e.g., network 150, network 240, networks 408, etc.). The notification can be provided by the communications module 424 via the communications interface 414. The notification can be provided to more than one user device. In some circumstances, the notification can be provided by an additional computing device (e.g., computing device 110, computing device 210, computing devices 310*a-c*, computing device 402, additional computing device 406, etc).

In some circumstances, an event timer may be initiated in response to sending a notification and a call may be initiated during the event timer. The timer may be initiated by a communications module (e.g., communications module 424). In some situations, the notification may identify the location where the particular sound was detected, the particular sound that was detected (e.g., running water), or the trigger event associated with the particular sound (e.g., water damage).

At block 508, the computing device can receive an indication to initiate a two-way audio stream. The indication can be received from one or more user devices (e.g., computing device 110, computing device 210, computing devices 310*a-c*, computing device 402, additional computing device 406, etc.) via one or more networks (e.g., network 150, network 240, networks 408). The two-way audio stream may be a multidirectional audio stream between the computing device, and two or more user devices.

At block 510, the computing device can provide a first alert that permission has been granted to initiate a two-way audio stream. The alert can be provided via a speaker of the computing device (e.g., speaker 446). The alert can be an audio alert given before the two-way audio stream has been initiated, during the stream, or after the stream has concluded. The alert can be a tone or speech warning anyone in the monitored environment that a call has begun or will begin. The alert can be repeated at periodic intervals during the two-way audio stream. In some situations, the alert can include a visual alert such as a light on the computing device.

At block 512, the computing device can initiate the two-way audio stream. The stream can be initiated by the communications module (e.g., communications module 424, etc.) and the stream can be between a user device (e.g., user devices 404) and the computing device (e.g., computing device 402, etc.) via one or more networks (e.g., networks 408). The computing device may generate a second alert for the duration of the two-way audio stream. The alert may be an audio alert or a visual alert that is generated continuously or at regular intervals during the two-way stream.

Illustrative techniques for using a computing devices to initiate a call in response to a detected event are described above. Some or all of these techniques may, but need not, be implemented at least partially by architectures such as those shown at least in FIGS. 1-5 above. While many of the embodiments are described above with reference to computing devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data (e.g., recorded speech) to event detection. The present disclosure contemplates that in some instances, this gathered data may include personally identifiable information (PII) data that uniquely identifies or can be used to contact or locate a specific person. Such personal information data can include characteristics of a person's speech, names, demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to notify a user of an event occurring in the user's home.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:

monitoring, by a computing device, a one-way audio stream for one or more trigger events, the one or more trigger events comprising a particular sound identified in the one-way audio stream;

detecting, by the computing device, the particular sound in the one-way audio stream;

providing, by the computing device, an event notification to a user device via a network connection, the event notification requesting permission from the user device to initiate a two-way audio stream between the computing device and the user device;

receiving, by the computing device and in response to the event notification, an indication from the user device to initiate the two-way audio stream with the user device;

providing a first alert, via a speaker of the computing device, wherein the first alert indicates that permission has been granted to initiate the two-way audio stream between the user device and the computing device; and initiating, by the computing device, the two-way audio stream with the user device.

2. The method of claim 1 wherein providing the event notification further comprises:

determining a distance between the computing device and a source of the detected particular sound;

transmitting the determined distance to a plurality of monitoring devices associated with the computing device;

receiving one or more determined distances from a subset of monitoring devices, of the plurality of monitoring devices, that detected the particular sound;

comparing the determined distance and the one or more determined distances to determine if the computing device is closer to the source than the subset of monitoring devices; and providing the event notification to the user device upon determining that the computing device is closer than the subset of monitoring devices.

3. The method of claim 1, wherein a notification is provided to a second user device, and wherein the two-way audio stream is a multidirectional audio stream between the computing device, the user device, and the second user device.

4. The method of claim 1, wherein the providing the event notification further comprises:

initiating, by the computing device, an event timer, wherein the two-way audio stream is configured to be initiated during the event timer.

5. The method of claim 1, wherein the event notification identifies the particular sound identified in the one-way audio stream.

6. The method of claim 1, wherein initiating the two-way audio stream further comprises:

providing, by the computing device, a second alert at regular intervals for a duration of the two-way audio stream, the second alert announcing that the two-way audio stream has been initiated.

7. The method of claim 1, wherein the user device comprises one of a smartphone, a smartwatch, a tablet, or a personal computer.

8. The method of claim 1, wherein the permission comprises a permission file, and wherein each user device has a different permission file.

9. The method of claim 1, wherein the providing the event notification to the user device comprises:

accessing, by the computing device, location information for the user device; and providing, by the computing device, the event notification to the user device based at least in part on the location information.

10. A non-transitory computer-readable medium storing a set of instructions, the set of instructions comprising one or more instructions that, when executed by one or more processors of a computing device, cause the computing device to perform operations comprising:

monitoring a one-way audio stream for one or more trigger events, the one or more trigger events comprising a particular sound identified in the one-way audio stream;

detecting the particular sound in the one-way audio stream;

providing an event notification to a user device via a network connection, the event notification requesting permission from the user device to initiate a two-way audio stream between the computing device and the user device;

receiving, in response to the event notification, an indication from the user device to initiate the two-way audio stream with the user device;

providing a first alert, via a speaker of the computing device, wherein the first alert indicates that permission has been granted to initiate the two-way audio stream between the user device and the computing device; and initiating the two-way audio stream with the user device.

11. The non-transitory computer-readable medium of claim 10, wherein the providing the event notification further comprises:

determining a distance between the computing device and a source of the detected particular sound;

transmitting the determined distance to a plurality of monitoring devices associated with the computing device;

receiving one or more determined distances from a subset of monitoring devices, of the plurality of monitoring devices, that detected the particular sound;

comparing the determined distance and the one or more determined distances to determine if the computing device is closer to the source than the subset of monitoring devices; and providing the event notification to the user device upon determining that the computing device is closer than the subset of monitoring devices.

12. The non-transitory computer-readable medium of claim 10, wherein a notification is provided to a second user device, and wherein the two-way audio stream is a multi-directional audio stream between the computing device, the user device, and the second user device.

13. The non-transitory computer-readable medium of claim 10, wherein the providing the event notification further comprises:

initiating an event timer, wherein the two-way audio stream is configured to be initiated during the event timer.

14. The non-transitory computer-readable medium of claim 10, wherein the event notification identifies the particular sound identified in the one-way audio stream.

15. The non-transitory computer-readable medium of claim 10, wherein initiating the two-way audio stream further comprises:

providing, by the computing device, a second alert at regular intervals for a duration of the two-way audio stream, the second alert announcing that the two-way audio stream has been initiated.

16. The non-transitory computer-readable medium of claim 10, wherein the permission comprises a permission file, and wherein each user device has a different permission file.

17. The non-transitory computer-readable medium of claim 10, wherein the providing the event notification to the user device comprises:

accessing, by the computing device, location information for the user device; and providing by the computing device, the event notification to the user device based at least in part on the location information.

18. A computing device comprising:

a storage device;

a speaker; and one or more processors configured to execute program instructions stored in the storage device to at least:

monitor a one-way audio stream for one or more trigger events, the one or more trigger events comprising a particular sound identified in the one-way audio stream;

detect the particular sound in the one-way audio stream;

provide an event notification to a user device via a network connection, the event notification requesting permission from the user device to initiate a two-way audio stream between the computing device and the user device;

receive, in response to the event notification, an indication from the user device to initiate the two-way audio stream with the user device;

provide a first alert, via the speaker, wherein the first alert indicates that permission has been granted to initiate the two-way audio stream between the user device and the computing device; and initiate the two-way audio stream with the user device.

19. The computing device of claim 18, wherein the providing the event notification further comprises:

determining a distance between the computing device and a source of the detected particular sound;

transmitting the determined distance to a plurality of monitoring devices associated with the computing device;

receiving one or more determined distances from a subset of monitoring devices, of the plurality of monitoring devices, that detected the particular sound;

comparing the determined distance and the one or more determined distances to determine if the computing device is closer to the source than the subset of monitoring devices; and providing the event notification to the user device upon determining that the computing device is closer than the subset of monitoring devices.

20. The computing device of claim 18, wherein a notification is provided to a second user device, and wherein the two-way audio stream is a multidirectional audio stream between the computing device, the user device, and the second user device.

21. The computing device of claim 18, wherein the providing the event notification further comprises:

initiating, by the computing device, an event timer, wherein the two-way audio stream is configured to be initiated during the event timer.

22. The computing device of claim 18, wherein the event notification identifies the particular sound identified in the one-way audio stream.

23. The computing device of claim 18, wherein initiating the two-way audio stream further comprises:

providing, by the computing device, a second alert at regular intervals for a duration of the two-way audio stream, the second alert announcing that the two-way audio stream has been initiated.

24. The computing device of claim 18, wherein the permission comprises a permission file, and wherein each user device has a different permission file.

25. The computing device of claim 18, wherein the providing the event notification to the user device comprises:

accessing, by the computing device, location information for the user device; and providing by the computing device, the event notification to the user device based at least in part on the location information.

* * * * *